US011643226B1

(12) United States Patent
Markcity et al.

(10) Patent No.: US 11,643,226 B1
(45) Date of Patent: May 9, 2023

(54) SPACECRAFT MATING MECHANISMS

(71) Applicant: Lockheed Martin Corporation, Bethesda, MD (US)

(72) Inventors: Jonathan Michael Markcity, Littleton, CO (US); Christopher Leighton Brown, Littleton, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 436 days.

(21) Appl. No.: 17/009,114

(22) Filed: Sep. 1, 2020

(51) Int. Cl.
*B64G 1/64* (2006.01)
*B64G 1/10* (2006.01)
*B64G 4/00* (2006.01)

(52) U.S. Cl.
CPC .............. *B64G 1/646* (2013.01); *B64G 1/641* (2013.01); *B64G 4/00* (2013.01); *B64G 2001/1092* (2013.01); *B64G 2004/005* (2013.01)

(58) Field of Classification Search
CPC .......... B64G 1/646; B64G 1/641; B64G 4/00; B64G 2001/1092; B64G 2004/005
See application file for complete search history.

(56) References Cited

U.S. PATENT DOCUMENTS

| | | | | |
|---|---|---|---|---|
| 4,195,804 A * | 4/1980 | Hujsak | ................... | B64G 1/646 244/172.4 |
| 5,094,410 A * | 3/1992 | Johnson | ................. | B64G 1/646 244/172.4 |
| 6,126,115 A * | 10/2000 | Carrier | ................... | B64G 1/641 294/82.26 |
| 7,828,249 B2 * | 11/2010 | Ritter | ..................... | B64G 1/646 244/172.4 |
| 7,857,261 B2 * | 12/2010 | Tchoryk, Jr. | ........... | B64G 1/646 280/514 |
| 9,764,478 B2 * | 9/2017 | Roberts | ................ | B25J 15/0226 |
| 2017/0096240 A1 * | 4/2017 | Cook | ..................... | B64G 1/646 |
| 2021/0300602 A1 * | 9/2021 | Bultitude | ................. | B64G 1/64 |

FOREIGN PATENT DOCUMENTS

WO WO-2016020390 A1 * 2/2016 ............. B64G 1/007

OTHER PUBLICATIONS

NASA, Hubble Space Telescope, SM2 Media Guide, K70110-01M, https://asd.gsfc.nasa.gov/archive/hubble/a_pdf/news/SM2-MediaGuide.pdf, 141 pages, downloaded Aug. 28, 2020.

(Continued)

*Primary Examiner* — Valentina Xavier

(57) ABSTRACT

Provided herein are various enhancements to spacecraft or other vehicles, including spacecraft docking mechanisms and vehicle mating systems. In one example, a vehicle mating mechanism includes a latch assembly of a vehicle having soft capture elements and hard capture elements. The soft capture elements accept a bar element of a mating vehicle and retain the bar element to within an envelope that provides a soft capture with the mating vehicle. The hard capture elements move within the envelope to engage the bar element and draw the bar element toward the vehicle to provide a hard capture with the mating vehicle. The vehicle mating mechanism can also include a cup-cone interface element of the vehicle that mates with a cup-cone interface element of the mating vehicle during the hard capture to establish an alignment between the vehicle and the mating vehicle.

20 Claims, 7 Drawing Sheets

(56) References Cited

OTHER PUBLICATIONS

NASA, Hubble Space Telescope Systems, SM3a Media Guide, K9322-05M, https://asd.gsfc.nasa.gov/archive/sm3a/downloads/sm3a_media_guide/HST-systems.pdf, 35 pages, downloaded Aug. 28, 2020.

National Research Council, "Assessment Of Options For Extending The Life Of The Hubble Space Telescope Final Report," https://asd.gsfc.nasa.gov/archive/sm3a/downloads/sm3a_media_guide/HST-systems.pdf, 146 pages, 2004.

\* cited by examiner

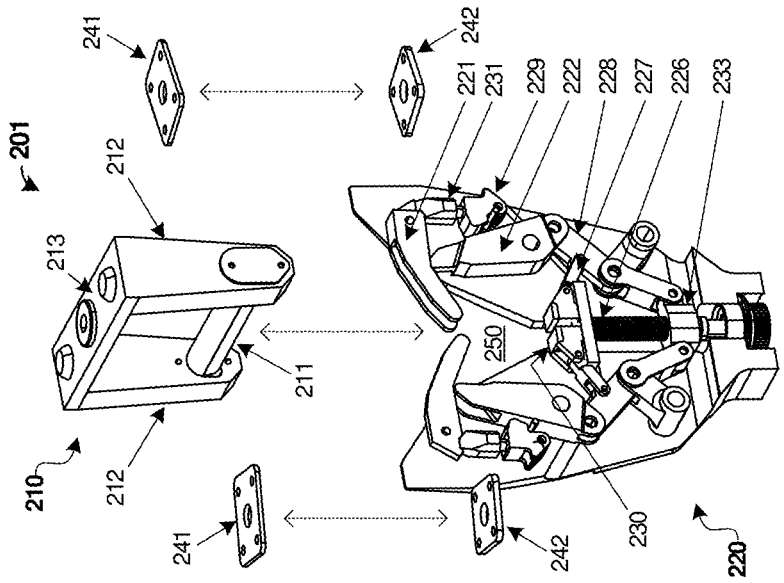
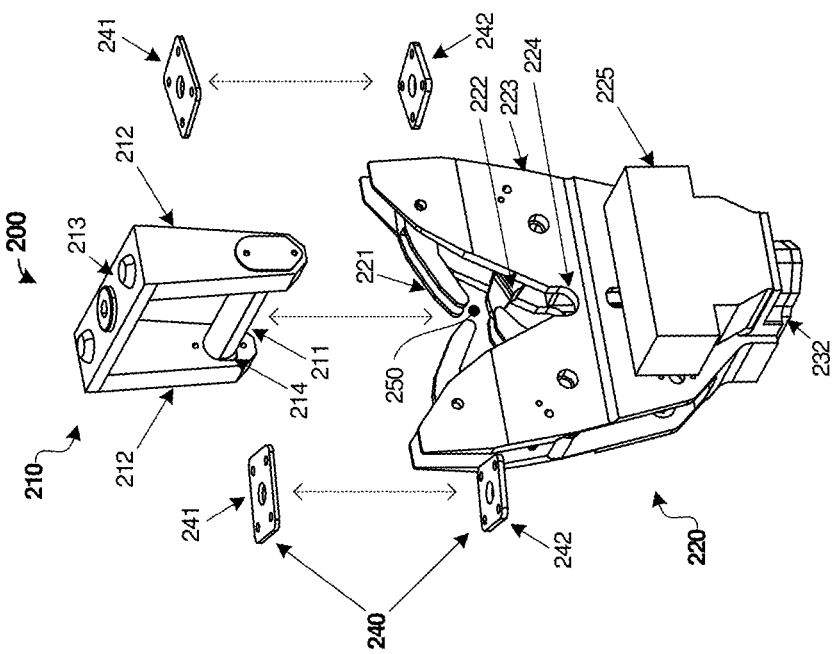
FIGURE 2A
FIGURE 2B

SPACECRAFT MATING MECHANISMS

TECHNICAL BACKGROUND

Spacecraft of various types can be carried by launch systems, such as rocket vehicles, into orbits about central bodies and into other trajectories or configurations in space. One form of spacecraft, often referred to as satellites, can be placed into orbit and these satellites can perform various tasks, such as sensing, surveillance, communications, or scientific experimentation. Other spacecraft include space stations, gateways, or transfer vehicles, which serve mission roles related to human habitation, transfer of payloads, and exploration. While some spacecraft might linger in orbits, other spacecraft can be utilized as transport vehicles to and from orbital spacecraft. These transport spacecraft can carry payloads including fuel, oxygen, equipment, supplies, and passengers to satellites, space stations, and other destinations including other orbits or surface missions.

When two spacecraft rendezvous, berthing or docking operations might be performed to mate the spacecraft and transfer payloads. Berthing typically includes using a robotic arm to manipulate one spacecraft for coupling to another spacecraft, and docking includes more direct coupling by the two spacecraft. Docking procedures can include soft dock and hard dock. In some examples, soft dock indicates that two spacecraft have made contact but are unsuitable for coupling of pressurized connections or umbilical links, while hard dock indicates that the spacecraft can achieve pressurized connection or umbilical linking. Many types of hard docking include complex pressurized docking mechanisms for human transfer, while other types of hard docking are limited in precision or in effectiveness for linking of umbilical or fluid connections. Moreover, external forces and force differentials between the mating spacecraft can lead to shearing forces on docking mechanisms which act to shift or separate the spacecraft from each other once docked.

Overview

Provided herein are various enhancements to spacecraft or other vehicles, including spacecraft docking mechanisms and vehicle mating systems. The various examples involve two vehicles, such as spacecraft, which engage in docking operations. The docking operations typically have two phases, a soft capture phase where an initial coupling between the two spacecraft is achieved, and a hard capture phase where a more precise and firm coupling between the two spacecraft is achieved. A first spacecraft will have a bar assembly, sometimes referred to as a towel bar, which mates with a clamp assembly of a second spacecraft. The clamp assembly includes several enhanced mechanisms and features to initiate a soft capture arrangement between the spacecraft and also engage the bar assembly for mating of one or more cup-cone alignment elements via a hard capture arrangement. The cup-cone elements are typically mounted proximate to the bar assemblies and clamp assemblies of the two mating spacecraft, and allow for precision alignment between the spacecraft. The hard capture phase completed by the clamp assembly leads to mating of the cup-cone elements, which can optionally further align various umbilical connections between the vehicles. Additionally, the bar assemblies can include compact preload features which can absorb shocks experienced in the mating mechanism and associated spacecraft due to momentum as well as from external separation forces experienced among the spacecraft.

Turning to one example implementation, a spacecraft mating mechanism includes a latch assembly of a vehicle having soft capture elements and hard capture elements. The soft capture elements accept a bar element of a mating spacecraft and retain the bar element to within an envelope that provides a soft capture with the mating vehicle. The hard capture elements move within the envelope to engage the bar element and draw the bar element toward the vehicle to provide a hard capture with the mating vehicle. The vehicle mating mechanism can also include a cup-cone interface element of the vehicle that mates with a cup-cone interface element of the mating vehicle during the hard capture to establish an alignment between the vehicle and the mating vehicle.

Another example implementation includes an apparatus having clamp mechanisms disposed on a first vehicle that are configured to confine bar elements disposed on a second vehicle to within a soft capture envelope. Responsive to actuation of jaw elements of the clamp mechanisms, the clamp mechanisms draw the bar elements of the second vehicle within the soft capture envelope towards the first vehicle. Cup-cone couplers are disposed on the first vehicle and are configured to engage mating cup-cone couplers disposed on the second vehicle responsive to actuation of the jaw elements.

In yet another example implementation, a vehicle comprises a means for accepting and retaining a bar element of a mating vehicle in a soft dock envelope, a means for drawing the bar element within the soft dock envelope towards the vehicle, and a means for retaining the bar element in a hard dock configuration. The vehicle also includes a means for establishing two or more axis alignment and shear force resistance for an umbilical connection between the vehicle and the mating vehicle in the hard dock configuration.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIGS. 2A and 2B illustrate spacecraft mating elements in an implementation.

DETAILED DESCRIPTION

Spacecraft berthing or docking operations are often performed to mate two spacecraft after rendezvous for transfer of materials, personnel, fuel, or other items, as well as for shared maneuvering. These berthing or docking operations might be automated or manually controlled by a pilot or operator. However, emerging zones for spacecraft deployment, such as cislunar space and lunar orbit, increase the need for more reliable and foolproof precision mating mechanisms and procedures. The examples herein discuss several enhanced systems and mechanisms for spacecraft to mate to one another with a high degree of precision to enable umbilical connections and subsequent transfer of propellants, supplies, signaling, and electrical power, among other functions. Moreover, the examples herein provide enhanced resistance to external forces during/after mating, which can create multi-axis shearing forces and rotational moments for the spacecraft and act to separate the spacecraft from each other.

Spacecraft can have different phases of docking or mating. In a first phase, referred to herein as soft docking or soft capture, some initial elements are grossly coupled between the two spacecraft and may allow for small relative movements between the spacecraft. Typically, soft capture phases relate to termination of powered thrust by the spacecraft. Soft capture, however, is typically not sufficient for pressurized coupling of the spacecraft for transfer of personnel or for certain umbilical or fluid connections. In contrast, a second phase includes hard docking or hard capture. This hard capture phase includes a more substantial engagement between mating elements of the two spacecraft, typically by mechanisms which draw and hold the spacecraft together. After hard capture, the spacecraft may further provide for initiation of pressurized coupling or umbilical connections.

Figure 1:
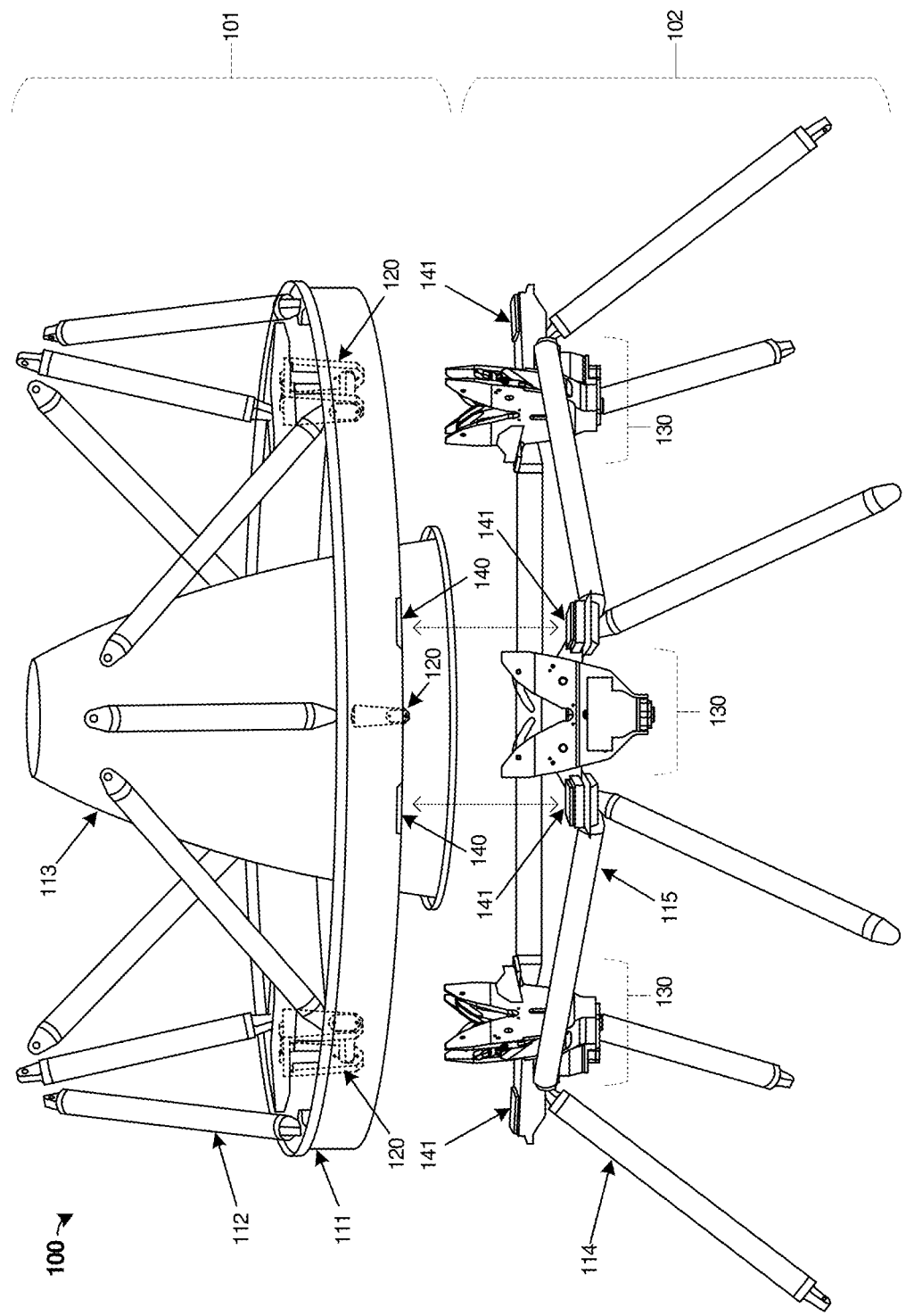
FIG. 1 illustrates a spacecraft mating configuration in an implementation.

As a first example of enhanced spacecraft mating systems and mechanisms, FIG. 1 is presented. FIG. 1 is a system diagram illustrating system 100 having two vehicles, namely spacecraft 101 and spacecraft 102. Although the term spacecraft is used herein for simplicity, the term spacecraft can refer to any vehicle, spacefaring, orbital, terrestrial, subsurface, aquatic, or otherwise. Spacecraft 101 is shown in part, having propulsion nozzle 113 surrounded by various structural struts 112 that couple circular vehicle separation ring 111 to a body of spacecraft 101 (not shown for clarity). Disposed at various locations about ring 111 are several mating elements comprising bar assemblies 120. Ring 111 can be omitted in some examples, and bar assemblies 120 might be coupled to one or more strut elements 112. Several cup-cone assemblies 140 are disposed on separation ring 111 of spacecraft 101. When a ring is not included, then cup-cone assemblies can be included on other protrusions, struts, or features to allow spacecraft 101 to mate with similar features of another spacecraft.

Also shown in FIG. 1 is spacecraft 102 in close proximity to spacecraft 101, such as during rendezvous of spacecraft 101 and spacecraft 102. Spacecraft 102 is shown in part, having several structural struts 114 coupling a body of spacecraft 102 (not shown for clarity) to an array of clamp assemblies 130 along with struts 115. Although FIG. 1 shows three bar assemblies 120 on spacecraft 101 and three clamp assemblies 130 on spacecraft 102, other examples can employ one or more of these structures. Spacecraft 101 and 102 can have a mix of bar assemblies 120 and clamp assemblies 130, and these elements can be arranged in a circle/ring configuration (shown in FIG. 1), or instead arranged in a linear array or other arrangement, including combinations thereof. However, a bar structure on one spacecraft will typically require a corresponding mating mechanism to mate with on another spacecraft. Further details and operational descriptions of bar assemblies 120 and clamp assemblies 130 are included in the various Figures herein.

Figure 8:
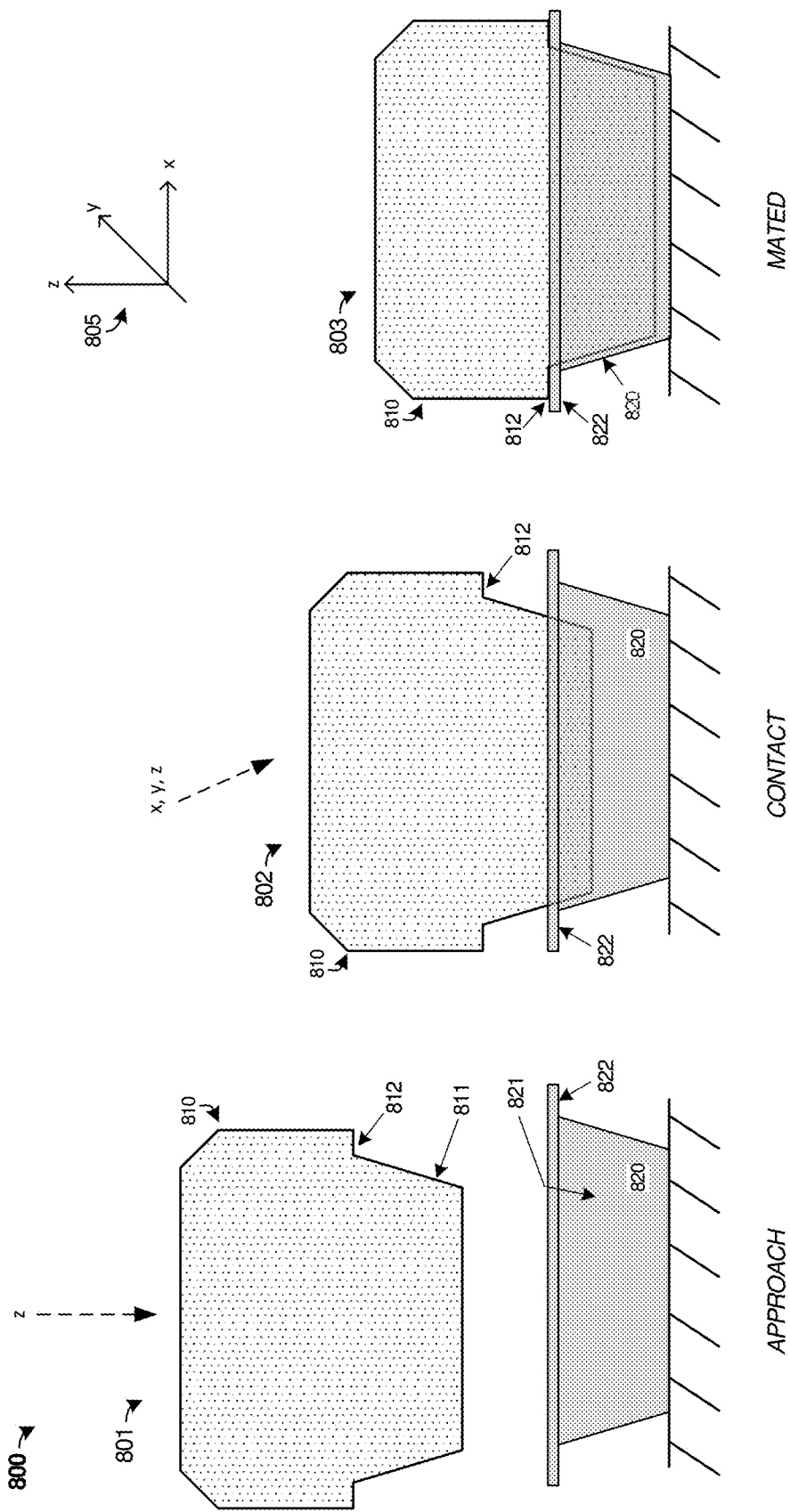
FIG. 8 illustrates spacecraft mating elements in an implementation.

In addition to bar assemblies 120 and clamp assemblies 130, several cup-cone assemblies 140-141 are shown in FIG. 1. Cup-cone assemblies 140-141, also referred to as cup-cone couplers, provide for a truncated cone and mating cup arrangement. When a particular cone element among cup-cone assemblies 140-141 is inserted into a corresponding cup element among cup-cone assemblies 140-141, a multi-axis seating is achieved between cup and cone features which provides a mating having a two-axis alignment and shearing resistance. FIG. 8 illustrates an example cup-cone mating arrangement, and is discussed below. Any of spacecraft 101-102 can include either cup elements or cone elements, depending upon implementation. However, a cup on one spacecraft will typically require a corresponding cone to mate with on another spacecraft.

Further detailing spacecraft 101 and 102, these can comprise any space-faring craft. Example craft include spaceships, service modules, landing modules, capsules, shuttles, stations, satellites, launch vehicle stages, payloads, science platforms, space observatories, probes, and other craft which may include vehicles that can operate in both the atmosphere and space. Spacecraft 101 and 102 may operate in orbit of another body, Lagrangian point, or can move between orbits and between target objects or destinations, which may include surface operations. Spacecraft 101 and 102 may have various propulsion systems, such as thrusters, stationkeeping components, attitude control, maneuvering thrusters, solar sails, or other mobility elements. Propulsion elements can include chemical rockets, nuclear-thermal rockets, cold-gas thrusters, reaction wheels, electric thrusters, solar-electric thruster systems, plasma thrusters, or other suitable propulsion elements, including combinations thereof. In addition to any propulsion elements, spacecraft 101 and 102 might also include various structural elements, propellant tanks, power generation and distribution systems, thermal control systems, payload bays, electronic/computer control systems, navigation/mating/logistical elements, surveillance elements, sensors, scientific payloads, strategic payloads, personnel support systems, pressurized portions, unpressurized portions, life support elements, and antennas/communication systems, among other components.

The various elements discussed herein, such as portions of bar assemblies, clamp assemblies, and cup-cone assemblies can be comprised of various materials. Example materials include metals, metallic alloys, and metallic compounds. For example, steel alloys as well as titanium and aluminum, or alloys thereof, can be employed for structural elements and mechanisms. Materials such as A286 steel and 15-5 PH steel might be employed for fasteners, pins, and linkages. Impact surfaces might comprise elastomeric materials, polymers, or other vacuum-tolerant and flexible materials mated to underlying metallic structures. Materials can be selected to prevent or reduce likelihood of cold welding, galvanic corrosion, and outgassing. Materials should be selected to handle the strength, durability, and shear resistance expectations between to mating spacecraft.

FIGS. 2A and 2B include example bar assemblies and clamp assemblies as an example of bar assemblies 120 and clamp assemblies 130 in FIG. 1. Furthermore, FIGS. 2A and 2B illustrate example cup-cone elements as an example of cup-cone assemblies 140-141 in FIG. 1. FIG. 2A illustrates view 200 having bar assembly 210 and clamp assembly 220, while FIG. 2B illustrates view 201 with a sectioned/internal view of clamp assembly 220. Similar elements are found in both FIGS. 2A and 2B, although variations are possible. Various soft capture elements and hard capture elements discussed herein might instead be referred to instead as fingers, jaws, or clamps, among other terms. Also, the bar elements discussed herein can also be referred to as towel bars, among other terms.

Bar assembly 210 includes bar element 211, mounting arms 212, and base 213. Bar element 211 is mounted between arms 212, and within channels 214 included in each of arms 212. Thus, bar element 211 can move within channels 214 of arms 212. As will be shown in later Figures, preload elements are included within channels 214 which are coupled to bar element 211. Clamp assembly 220 comprises soft capture elements 221, hard capture elements 222, structure/chassis 223, chassis divot 224, motor 225, screw drive 226, nut element 233, impact surface linkages 227, main linkages 228, soft capture element cams 229, impact surfaces 230, soft capture element linkages 231, and clamp assembly base 232, among other elements shown in the Figures. Cup-cone assembly 240 includes cone elements 241 and cup elements 242. It should be understood that elements 241 can instead comprise cup type elements and elements 242 can instead comprise cone type elements. When employed on a spacecraft, bases 213 and 232 are typically mounted to a portion of the respective spacecraft. Moreover, elements 241 and 242 are mounted proximate to the associated bar assembly or clamp assembly and at an appropriate stackup with respect to the bar/clamp to ensure seating of a cone into a corresponding cup during mating.

Figure 3:
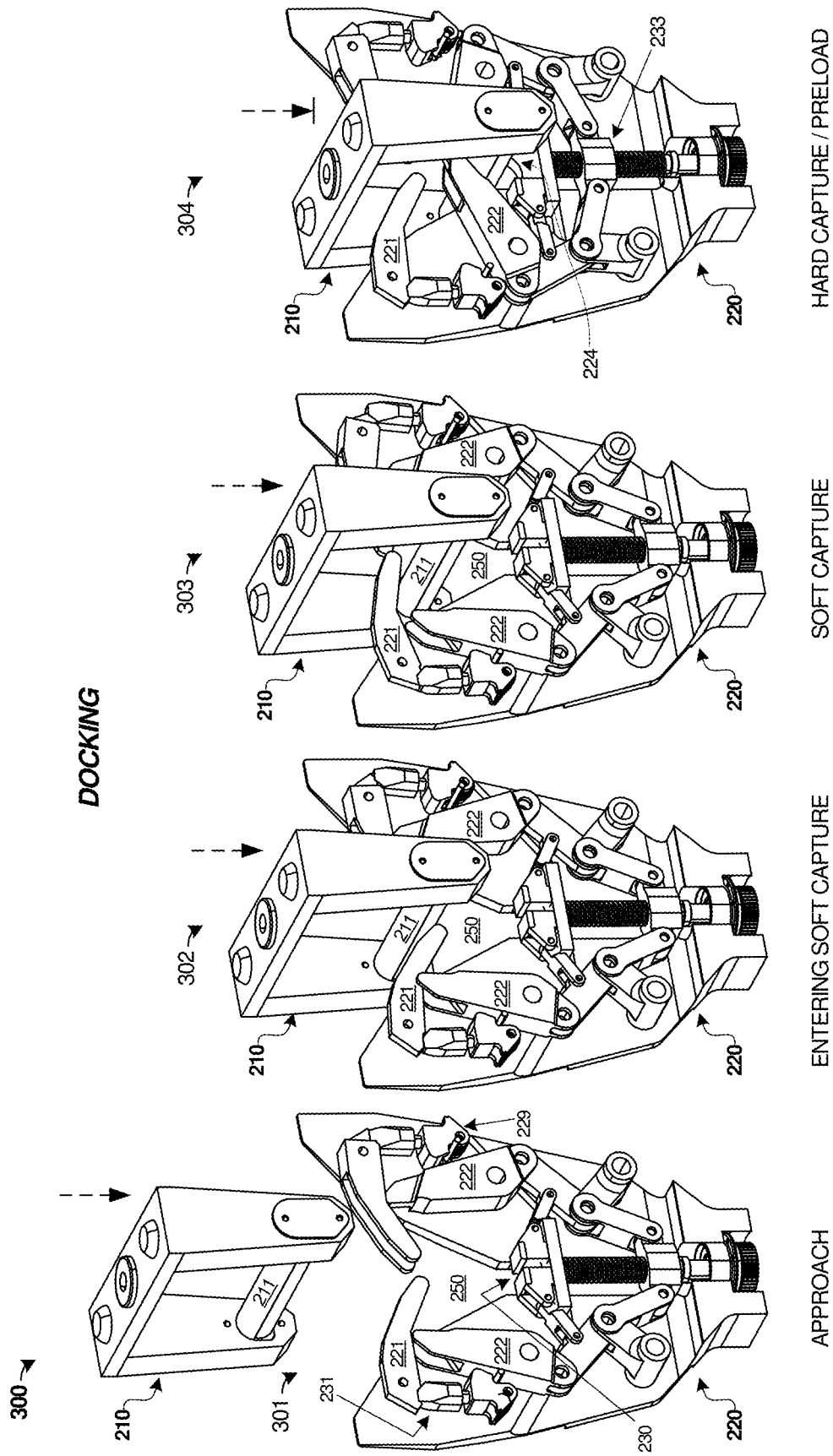
FIG. 3 illustrates docking of spacecraft mating elements in an implementation.
Figure 4:
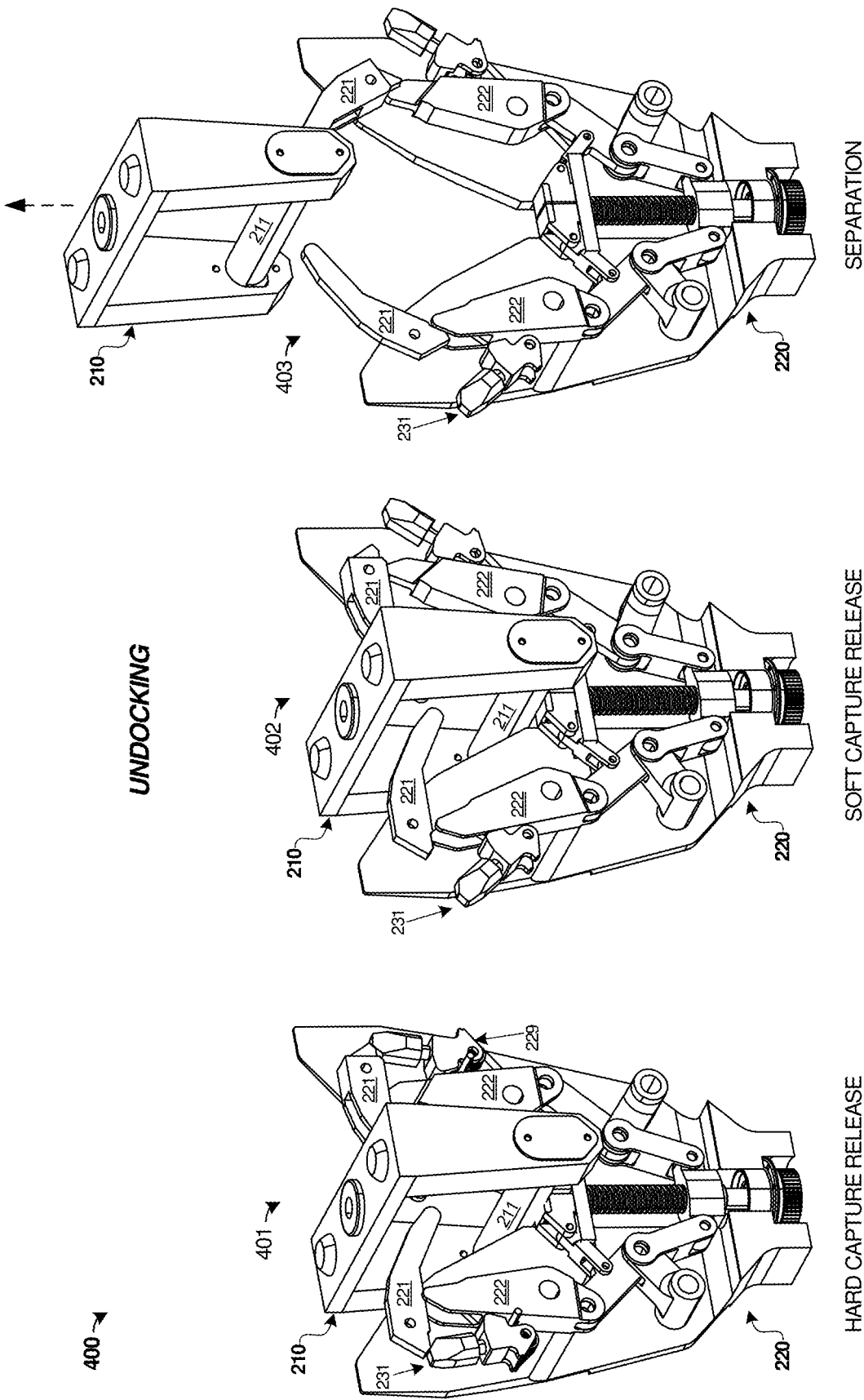
FIG. 4 illustrates undocking of spacecraft mating elements in an implementation.

The operation of bar assembly 210 and clamp assembly 220 is now discussed in FIGS. 3-4. FIG. 3 illustrates docking operations 300 between two associated spacecraft, and FIG. 4 illustrates undocking operations 400. Although one example bar assembly and clamp assembly are shown in FIGS. 3-4, spacecraft might have more than one instance of these assemblies in an array, such as seen in FIG. 1. Operation of further instances of these assemblies can proceed similarity. Also, mating of cup-cone elements, such as cup-cone assemblies 240, will be included in the discussion surrounding FIG. 8.

In operation 301 of FIG. 3, a first spacecraft having bar assembly 210 will be brought into proximity to a second spacecraft having clamp assembly 220, such as during a rendezvous process. As the two spacecraft continue to approach each other, bar element 211 is brought towards soft capture elements 221 of clamp assembly 220. In operation 302, bar element 211 has made initial contact with soft capture elements 221, pushes inward onto soft capture elements 221, and begins to enter soft capture envelop 250. Soft capture envelope 250 is defined by the reach/extent of soft capture elements 221 and impact surfaces of clamp assembly 220. In operation 303, bar element 211 has passed through soft capture elements 211 and entered into soft capture envelope 250. Soft capture elements 221 might be spring-loaded or piston-coupled to provide rebound of soft capture elements 221 after entry of bar element 211 into soft capture envelope 250, thus providing a one-way entry function for bar element 211. Specifically, once bar element 211 passes through a predetermined entry threshold with respect to clamp assembly 220 defined by soft capture elements 221, bar element 211 will not be allowed to exit soft capture envelope 250 without a commanded release of soft capture elements 221. Linkage elements 229 and 231 provide for inward movement of soft capture elements 221 and prevention of outward movement until commanded to release. Bar element 211 (and thus the associated spacecraft) can then float or drift within the confines of soft capture envelope 250 defined by the inner surfaces of soft capture elements 221 and impact surfaces of clamp assembly 220.

Once bar element 211 is within soft capture envelope 250, momentum or maneuvers of the associated spacecraft may carry bar element 211 further into soft capture envelope 250. To mitigate impacts of bar element 211 onto components of clamp assembly 220, impact surfaces 230 can be included in clamp assembly 220. When hard capture elements 222 are open, then impact surfaces 230 are extended into soft capture envelope 250 to provide a surface for bar element 211 to impact. Various linkage elements or actuation elements can provide for movement of impact surfaces 230, and one such example is shown in FIGS. 1-3. Specifically, linkage elements 227 move impact surfaces 230 in and out of soft capture envelope 250 and protect chassis divot 224 of clamp assembly 220 when deployed. Linkage elements 227 are coupled to main linkages 228 and thus can move in and out of soft capture envelope 250 by sliding on an associated surface member when hard capture elements 222 are actuated with main linkages 228. It should be understood that other mechanisms and actuation procedures can be employed for impact surfaces 230. In other examples, impact surfaces might be integrated into chassis divot 224, such as surfaces formed by elastomeric elements or hardened metallic surfaces.

Turning now to a hard dock operation, operation 304 is shown. It should be noted that preload operations and cup-cone mating is performed during the hard dock in operation 304, but this will be discussed separately below. Operation 304 illustrates hard capture elements 222 rotating about a pivot point within soft capture envelope 250 to engage bar element 211. Once engaged, hard capture elements 222 can be actuated to pull bar element within soft capture envelope 250 towards mating surface 224. Concurrent with actuation of hard capture elements 222, in this example, impact surfaces 230 are retracted to expose chassis divot 224. Thus, soft capture envelope 250 provides an envelope, that when bar element 211 is within said envelope, hard capture elements 222 can sweep to engage and capture bar element 211. The sweep radius of hard capture elements 222 at least partially defines soft capture envelope 250, such that hard capture elements 222 can engage bar element 211 anywhere within soft capture envelope 250. As hard capture elements 222 continue actuation or sweeping downward, bar element 211 is further drawn toward chassis divot 224 until corresponding cup-cone elements 241 and 242 are mated and arrest relative movement between spacecraft. Once hard capture elements 222 have closed enough to draw bar element 211 downward and engage corresponding cup-cone elements 241 and 242, then hard dock completes the structural load path in the axial direction (up/down in FIGS. 2A/2B).

Main linkages 228 of clamp assembly 220 are coupled to screw drive 226 at nut element 233 by further linkage elements, and motor 225 can turn screw drive 226 to actuate nut element 233 and thus hard capture elements 222. Actuation of screw drive 226 by motor 225 is referred to as commanded operation, such as commanded capture or commanded release. A control system or powered apparatus can be coupled to motor 225 for initiation and control of motor 225. Motor 225 provides torque onto the shaft comprising screw drive 226. Motor 225 can comprise any suitable motor type, such as stepper motors, servo motors, direct drive motors, or harmonic drive motors, among others. One rotation direction of screw drive 226 provides for moving nut element 233 downward and opening of hard capture elements 222, while the opposite rotation direction of screw drive 226 provides for moving nut element 233 upward and closing of hard capture elements 222. Locking mechanisms can be employed to ensure hard capture elements 222 do not open once closed, however screw drive 226 and the associated linkages provide for some resistance to movement of hard capture elements 222 by forces exerted by bar element 211. For example, when nut element 233 is driven upward above top-dead-center of its attached linkages 228, screw drive 226 is prevented from back-driving due to loads imparted by bar element 211. In addition, if nut element 233 does drive further than expected, nut element 233 will be restrained by chassis 223. When hard capture elements 222 are not actuated, these elements are configured in an open arrangement which partially coincides with soft capture elements 221. As seen in FIGS. 1-3, a tip portion of hard capture elements 222 is partially overlapping with a portion of soft capture elements 221. This can provide for a larger sweep radius for hard capture elements 222, as well as a more compact stackup for clamp assembly 220. Furthermore, the tip portions of hard capture elements 222 can provide for an inward stopping surface for movement of soft capture elements 221.

A preload operation is also performed during hard dock using hard capture elements 222 with regard to bar element 211. As discussed above, ends of bar element 211 can move within channels or slots of arms 212 of bar assembly 210. Bar element 211 is coupled in these slots to arms 212 using one or more preload elements, not shown in FIGS. 1-3 for clarity. However, FIG. 5 illustrates these preload elements, which will be discussed before returning to a discussion on the undocking processes in FIG. 4.

Figure 5:
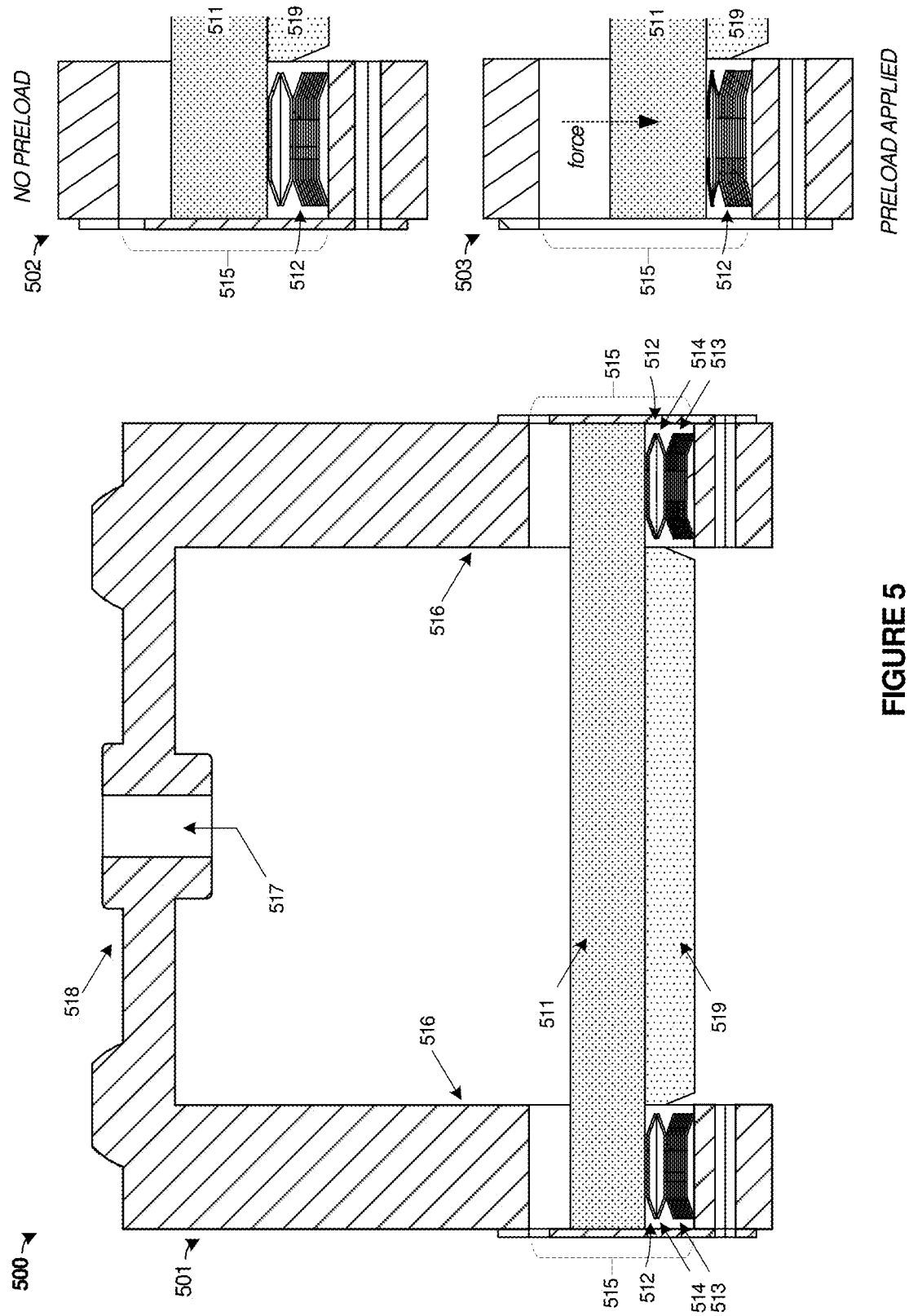
FIG. 5 illustrates spacecraft mating elements in an implementation.

FIG. 5 includes bar assembly 501 comprising bar element 511 positioned within slots 515 of arms 516. Bar assembly 501 can be mounted to a corresponding spacecraft at mounting surface 518, such as by one or more fasteners coupled through mounting hole 517. Bar element 511 might include impact surface 519 which comprises a hardened metallic or elastomeric material. Impact surface 519 is discussed further in FIG. 6 below. Preload elements 512 are shown coupling bar element 511 to arms 516 within slots 515. Preload elements 512 provide for compensation of stackup tolerances between spacecraft mating surfaces/features as well as for more dynamic changes in spacecraft mating and mitigation of some external force differentials. For example, stackup differences between spacecraft or mating features of the spacecraft might create gaps between the spacecraft which can experience slamming or vibration effects. Preload elements 512 can advantageously mitigate these effects. Preload forces are applied through hard capture elements that engage bar elements and are transferred through the spacecraft to cup-cone assemblies which accompany the clamps/bars.

In FIG. 5, preload elements 512 comprise stacked coned/disc springs. The stacked disc springs are formed by a stack of individual disc springs to form a coupled column of springs. Such an arrangement of disc springs can provide for resistance to forces/movement in the compression direction. One example type of stacked springs includes Belleville washer stacks. Selectable deflection forces and selectable displacement magnitudes can be provided for preload elements 512 depending upon quantity of disc springs and the series/parallel coupling configuration between individual disc springs. Parallel coupling refers to nesting of adjacent springs in the same orientation, whereas series coupling refers to non-nested adjacent springs having opposite orientations. The amount of displacement is proportional to the quantity of individual springs coupled in series, while the amount for deflection force is proportional to the quantity of individual springs coupled in parallel.

As shown in FIG. 5, several springs are coupled in parallel on the 'bottom' portion of the stack (513), and at least two springs are coupled in series on the 'top' portion of the stack (514). This configuration provides preload elements 512 with a desired spring force and maximum/minimum displacement amount. Bar element 511 might free-float in channel 515 until contact with preload elements 512 during docking/mating, or might instead be coupled to the top portion 514 of the stacks, such as by welding, adhesives, or fasteners. When hard capture elements, such as hard capture elements 222 of FIGS. 1-3, engage bar element 511, bar element 511 will move within slots 515 according to a direction/amount of force and displacement allowed by preload elements 512. Preload elements 512 can absorb and mitigate at least a portion of the forces that act to separate the two docking spacecraft when coupled through hard capture elements of a first spacecraft and a bar element of a second spacecraft. The size of slots 515 will thus be related to the maximum displacement of preload elements 512, an intrinsic height of preload elements 512, and a thickness of bar element 511.

View 502 of FIG. 5 illustrates a configuration without a preload applied (e.g. no preload), such as when bar element 511 is not engaged with hard capture elements of a clamp assembly. Thus, the spring stack forming preload element 512 will be in an uncompressed/unstretched state. View 503 of FIG. 5 illustrates a configuration with preload applied to bar element 511, such as when bar element 511 has been engaged by hard capture elements and external forces are attempting to separate the two associated mating spacecraft. View 503 shows preload element 512 in a compressed state, with a force pushing bar element 511 in a 'downward' direction in the view.

Returning to a discussion of the docking operations, FIG. 4 is presented to illustrate an undocking process 400. Operation 401 begins after hard capture elements 222 have been commanded and actuated to release bar element 211. For example, motor 225 might turn screw drive 226 to move nut element 233 downward to actuate hard capture elements 222 upward which releases bar element 211 and cup-cone elements 241/242. Although operation 401 shows impact surfaces 230 remaining extended into envelope 250, other examples might have these elements retracted until more significant upward movement of hard capture elements 222. Operation 402 shows further sweeping of hard capture elements 222 upward and away from bar element 211 until hard capture elements 222 release soft capture element cams 229 and soft capture element linkages 231 to allow soft capture elements 221 to move freely outward and provide for exit of bar element 211 from envelop 250 in operation 403. Operation 403 thus illustrates separation of the two previously mated spacecraft. Typically, at least one of the spacecraft will exert a separation force between the two spacecraft, such as by using thrusters, pushers, or other elements. Once separated, clamp assembly 220 can be prepared for another docking process, such as by placing soft capture elements 221 into a one-way configuration via soft capture element cams 229 and soft capture element linkages 231. This one-way configuration can be accomplished through the use of torsion springs that rotate soft capture element cams 229 and soft capture element linkages 231 back into their initial (pre-separation) condition when hard capture elements 222 are rotated out of the way when returned to their initial (pre-separation) condition.

Figure 6:
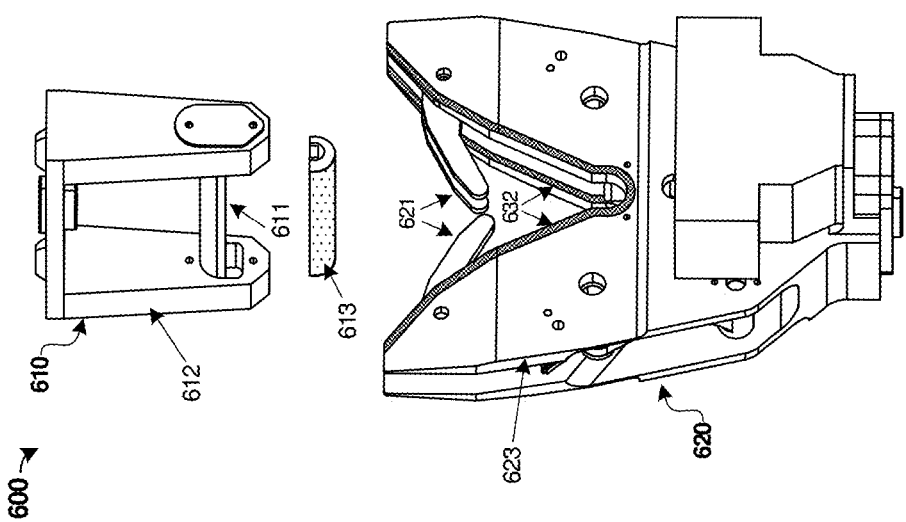
FIG. 6 illustrates spacecraft mating elements in an implementation.

FIG. 6 illustrates example impact surfaces which can optionally be provided on the various bar assemblies and clamp assemblies discussed herein. System 600 includes bar assembly 610 and clamp assembly 620 which can comprise similar elements discussed above for FIGS. 1-5, although variations are possible.

Bar assembly 610 includes arms 612 which carry bar element 611 having impact surface 613. Impact surface 613 comprises a bumper comprising material with different properties than that of the remainder of bar element 611. Impact surface 613 might comprise an elastomeric material or polymer material to absorb at least a portion of a shock or impulse experienced on a spacecraft when bar element 611 contacts surfaces of clamp assembly 620 during docking or undocking. Impact surface 613 might instead comprise hardened metallic materials or alloys which can tolerate higher levels of wear or impact than a material of the remainder of bar element 611.

Clamp assembly 620 includes soft capture elements 621 and impact surfaces 632. Once bar element 611 enters a soft capture envelope defined by soft capture elements 621, momentum of the spacecraft or external forces might carry bar element 611 to impact structural/chassis portions 623 of clamp assembly 620. Impact surfaces 632 can be provided to absorb or mitigate at least a portion of the shock/impulse experienced on a spacecraft when bar element 611 contacts surfaces of clamp assembly 620 during docking or undocking. Impact surfaces 632 might include bumpers comprising an elastomeric material or polymer material to absorb at least a portion of a shock or impulse experienced on a spacecraft when bar element 611 contacts surfaces of clamp assembly 620 during docking or undocking. Impact surfaces 632 might instead comprise hardened metallic materials or alloys which can tolerate higher levels of wear or impact than a material of the remainder of the structural/chassis portions 623 of clamp assembly 620.

Figure 7:
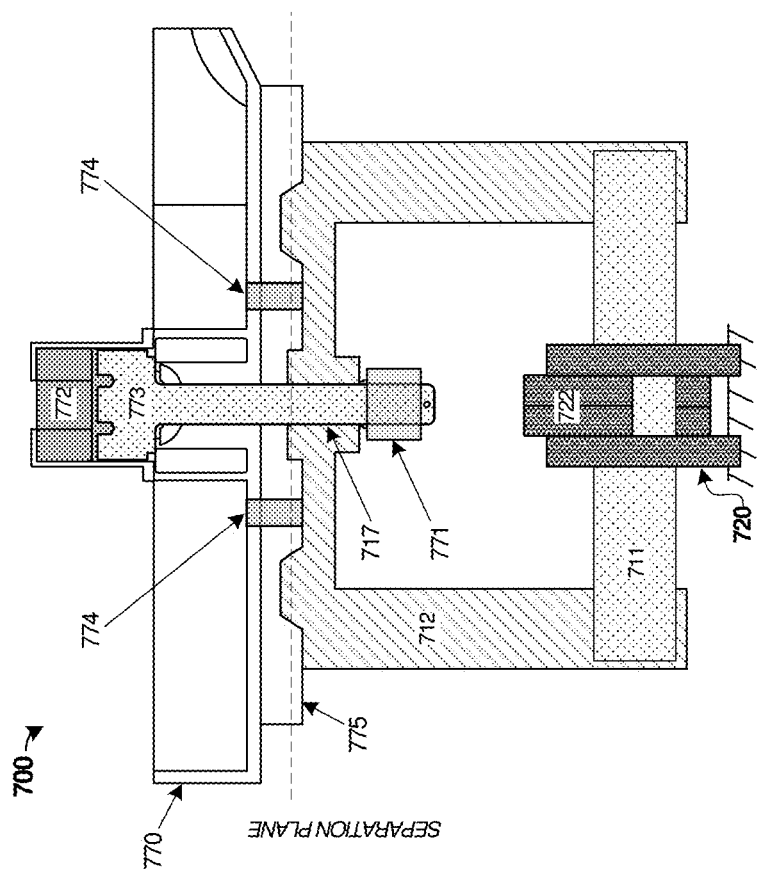
FIG. 7 illustrates spacecraft mating elements in an implementation.

FIG. 7 illustrates example quick disconnect features which can optionally be employed on the various bar assemblies discussed herein. FIG. 7 illustrates quick separation of two spacecraft by sacrificial shedding of a portion of the bar assembly of a first spacecraft. However, other examples might instead (or in combination) sacrificially shed portions of a clamp assembly. System 700 includes mounting plate 770, adapter plate 775, bar assembly 710, and a portion of clamp assembly 720. Mounting plate 770 comprises a portion of a first spacecraft which has bar assembly 710 coupled thereto by separation bolt 773. Bar assembly 710 includes bar element 711 mounted into armature 712. Armature 712 includes mounting hole 717 through which separation bolt 773 is disposed. Armature 712 is coupled to mounting plate 770 via separation adapter plate 775, bolt 773, and nut 771, and thus coupled to the first spacecraft. When mated to a second spacecraft, arms 722 of the second spacecraft can engage and hold bar element 711 of the first spacecraft.

However, situations and conditions might arise where rapid separation between the spacecraft might be necessitated, such as emergencies, during force overload conditions, or according to other unforeseen circumstances. These situations can be referred to as abort scenarios where quick/rapid decoupling between spacecraft is desired. Separation bolt 773 or nut 771 can be destructively decoupled from armature 712 and thus bar element and armature 712 would remain engaged within arms 722 of the second spacecraft while the remainder of the first spacecraft can exit the docking configuration. When separation bolt 773 comprises a frangible bolt or explosive bolt, then actuation element 722 can be commanded to trigger heating or pyrotechnical elements to shear off separation bolt 773. Armature 712 will be quickly and destructively separated from mounting plate 770 while bar element 711 remains captured by arms 722. When nut 771 comprises a frangible nut, then an associated actuation element can be commanded to trigger heating or pyrotechnical elements to split nut 771 and free bolt 773 to separate armature 712 from mounting plate 770.

Shear pins 774 are included as an optional feature. In FIG. 7, shear pins 774 are engaged between mounting plate 770 and adapter plate 775. Adapter plate 775 with shear pins 774 and associated cup/cone interfaces (not shown) are used as means of attaching and precisely locating armature 712 on the associated spacecraft, while transferring shear load.

Turning now to FIG. 8, a detailed discussion is included regarding the cup-cone mating interfaces and cup-cone interface elements included in the preceding Figures. As previously shown in FIG. 1 (elements 140 and 141) and FIGS. 2A/2B (elements 240), cup-cone elements accompany each of the bar assemblies and clamp assemblies and are mated together during hard docking procedures. The bar assemblies and clamp assemblies provide a somewhat coarse alignment of two spacecraft, and fine alignment is provided by cup-cone assemblies included on each spacecraft. The bar assemblies and clamp assemblies provide a coupling force (with preload features) that are opposed by mating of the cup-cone assemblies. Thus, clamp assemblies apply a force to the bar assemblies in the downward z-axis direction, while cup-cone assemblies provide a reactive force in the upward z-axis direction. Cup-cone assemblies are typically positioned nearby to associated bar assemblies or clamp assemblies to allow efficient load paths. In other examples, the application and design parameters for a first spacecraft and corresponding second spacecraft might warrant further spacing between cup-cone assemblies and corresponding clamp/bar assemblies. However, too great of a spacing can be limited by the structural stiffness of supporting structures. Cup-cone assemblies provide for precision mating between two spacecraft in more than one axis. When two or more cup-cone assemblies are employed, precision alignment between two spacecraft can provide for umbilical alignment (not shown in FIG. 8 for clarity), among other link alignment. FIG. 8 shows three operational phases of mating between cup-cone assemblies, namely operations 801-803. Reference axes 805 are also shown to help illustrate alignment directionality. It should be understood that the specific choice of axis alignment in FIG. 8 can vary.

In operation 801, cone assembly 810 is brought into proximity of cup assembly 820. Cup assembly comprises a truncated cone configuration, with cavity 821 formed to accept a cone assembly. Likewise, cone assembly 810 comprises a truncated cone configuration, with protrusion 811 matched to fit into cavity 821. Operation 801 might coincide with a soft capture phase between a bar assembly and a clamp assembly. Thus, the physical alignment between cone assembly 810 and cup assembly 820 can vary dynamically as the spacecraft move with respect to one another and the associated bar assembly floats within a soft capture envelope. Operation 802 shows cone assembly 810 being drawn towards cup assembly 820, such as during engagement of hard capture elements. As seen in operation 802, alignment between cone assembly 810 and cup assembly 820 is now being directed by the shapes of cone assembly 810 and cup assembly 820 upon entry of protrusion 811 into cavity 821. The conical shaping allows for alignment in at least the x and y axes in FIG. 8 as protrusion 811 is drawn further into cavity 821. Operation 803 shows cone assembly 810 seated into cup assembly 820, such as after closure of hard capture elements. Opposing shoulders/flats of the cup-cone elements (elements 812 and 822), and sidewalls of the cup-cone features (sidewalls of protrusion 811 and cavity 821) will interface to provide seating between cone assembly 810 and cup assembly 820. Elements 812 and 822 arrest relative motion of cone assembly 810 and cup assembly 820 in the z-axis, and thus arrest relative motion between the mating spacecraft. Cavity 821 can be deeper than the height of protrusion 811, so protrusion 811 does not "bottom out" when cone assembly 810 and cup assembly 820 fully engaged (i.e. side wall to side wall). Once mated, protrusion 811 is aligned along the x and y axes with cavity 821 and seated in the z axis. Clamping forces provided by hard capture elements ensure that a corresponding bar assembly is held in the z axis, and the shape of protrusion 811 and cavity 821 ensure that relative movement between spacecraft in the x and y axes is highly restricted or prevented. Thus, cup-cone assemblies provide resistance to shear loads experienced between the mating spacecraft.

In some examples, cup-cone assemblies set the docking stackup in the z axis between the spacecraft when a mating bar element is in a hard capture configuration. Since each bar element is coupled to arms via a movable preload element (such as shown in FIG. 5), some amount of z-axis tolerance is provided between each clamp assembly and bar assembly when cup-cone elements are fully mated. Once seated, the cup-cone assemblies can provide for alignment among various features between the two mating spacecraft, such as umbilical connections, gas connections, liquid connections, fuel lines, oxygen lines, and waste lines, among other links, as well as pressurized personnel transfer tunnel structures.

In further implementations of the examples herein, a vehicle includes at least one mating mechanism. The vehicle includes a means for accepting and retaining a bar element of a mating vehicle in a soft dock envelope. The means for accepting and retaining a bar element can include soft capture elements, such as discussed herein for elements 130 of FIG. 1, elements 221, 229, 230, and 231 of FIGS. 2A, 2B, 3, and 4, as well as elements 621 of FIG. 6, among others. The vehicle includes a means for drawing the bar element within the soft dock envelope towards a bar mating surface, and a means for retaining the bar element against the bar mating surface in a hard dock configuration. The means for drawing the bar element within the soft dock envelope can include hard capture elements, such as discussed herein for elements 130 of FIG. 1, elements 222, 225, 226, 227, and 228 of FIGS. 2A, 2B, 3, and 4, as well as elements 720 and 722 of FIG. 7, among others. The vehicle can also include a means for establishing two or more axis alignment and shear force resistance for an umbilical connection between the vehicle and the mating vehicle in the hard dock configuration. The means for establishing two or more axis alignment and shear force resistance can include cup-cone elements, such as discussed herein for elements 140 of FIG. 1, elements 240, 241, and 242 of FIGS. 2A and 2B, and elements 810 and 820 of FIG. 8, among others. The bar element can include a preload means that couples ends of the bar element to mounting members on the mating vehicle, where the preload means applies a preload force to the bar element movably disposed in slots of the mounting members. The bar element and preload means include elements such as elements 120 of FIG. 1, elements 210-214 of FIGS. 2A, 2B, 3, and 4, any of the elements of FIG. 5, elements 610-613 of FIG. 6, and elements 711-712 of FIG. 7, among others.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials, manufacturing processes, and propellants discussed herein are employed according to the descriptions above. However, it should be understood that the disclosures and enhancements herein are not limited to these materials, manufacturing processes, and propellants, and can be applicable across a range of suitable materials, manufacturing processes, and propellants. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A vehicle mating mechanism, comprising:
    a latch assembly of a vehicle having soft capture elements and hard capture elements, wherein the soft capture elements accept a bar element of a mating vehicle and retain the bar element to within an envelope that provides a soft capture with the mating vehicle, and wherein the hard capture elements move within the envelope to engage the bar element and draw the bar element toward the vehicle to provide a hard capture with the mating vehicle;
    a first cup-cone interface element of the vehicle, wherein the first cup-cone interface element mates with a second cup-cone interface element of the mating vehicle during the hard capture to establish an alignment of the vehicle with the mating vehicle.

2. The vehicle mating mechanism of claim 1, wherein the bar element of the mating vehicle provides a preload configuration for external force mitigation during the hard capture comprising a spring force applied between the bar element and slots of mounting members into which the bar element is disposed and applied through the first cup-cone interface element and the second cup-cone interface element.

3. The vehicle mating mechanism of claim 2, wherein the preload configuration comprises one or more stacks of coned disc springs.

4. The vehicle mating mechanism of claim 1, wherein the soft capture with the mating vehicle comprises a coarse alignment between the vehicle and the mating vehicle, and wherein the hard capture with the mating vehicle provides a fine alignment between the vehicle and the mating vehicle.

5. The vehicle mating mechanism of claim 4, wherein the fine alignment comprises a multi-axis alignment that aligns at least an umbilical connection, gas connection, or liquid connection between the vehicle and the mating vehicle.

6. The vehicle mating mechanism of claim 1, wherein the mating established by the first cup-cone interface element with the second cup-cone interface element provides shear load resistance after the hard capture.

7. The vehicle mating mechanism of claim 1, comprising:
a motor assembly comprising a screw drive coupled to a linkage arrangement configured to move the hard capture elements.

8. The vehicle mating mechanism of claim 7, comprising:
an impact assembly coupled to the linkage arrangement that provides an impact surface for the bar element during the soft capture, wherein the linkage arrangement is configured to retract the impact surface during movement of the hard capture elements for the hard capture and allow mating of the first cup-cone interface element and the second cup-cone interface element.

9. The vehicle mating mechanism of claim 1, wherein the bar element is coupled to the mating vehicle with one or more frangible elements to quick release at least the bar element from the mating vehicle to abort the mating vehicle from the soft capture or hard capture.

10. The vehicle mating mechanism of claim 1, wherein nominal release of the mating vehicle comprises opening of the hard capture elements and the soft capture elements to disengage the bar element and disengage the first cup-cone interface element from the second cup-cone interface element.

11. An apparatus, comprising:
clamp mechanisms disposed on a first vehicle and configured to confine bar elements disposed on a second vehicle to within a soft capture envelope and, responsive to actuation of jaw elements of the clamp mechanisms, draw the bar elements of the second vehicle within the soft capture envelope towards the first vehicle; and
cup-cone elements disposed on the first vehicle and configured to engage mating cup-cone elements disposed on the second vehicle responsive to actuation of the jaw elements.

12. The apparatus of claim 11, wherein the clamp mechanisms comprise soft capture arms configured to allow entry of the bar elements into the soft capture envelope and prevent release of the bar elements from the soft capture envelope until a release of the bar elements is initiated.

13. The apparatus of claim 11, wherein the jaw elements of the clamp mechanisms are coupled by linkage arrangements to associated motors that drive actuation of the jaw elements.

14. The apparatus of claim 11, comprising:
soft capture impact surfaces disposed within the soft capture envelope and configured to handle impacts from the bar element of the second vehicle to at least the bar mating surfaces before the jaw elements are actuated; and
concurrent with actuation of the jaw elements, at least a portion of the soft capture impact surfaces configured to retract and allow mating between the cup-cone elements of the first vehicle and the cup-cone elements of the second vehicle.

15. The apparatus of claim 11, wherein the cup-cone elements on the first vehicle comprise at least one among a cup elements or cone elements that mate with at least one among cup elements or cone elements of the mating cup-cone elements on the second vehicle.

16. The apparatus of claim 11, wherein the bar elements of the second vehicle provide a preload configuration for external force mitigation comprising spring forces applied between the bar elements and slots of mounting members into which the bar elements are disposed on the second vehicle and applied through the cup-cone elements of the first vehicle and the cup-cone elements of the second vehicle.

17. The apparatus of claim 16, wherein the preload configuration comprises one or more stacks of coned disc springs.

18. A vehicle, comprising:
a means for accepting and retaining a bar element of a mating vehicle in a soft dock envelope;
a means for drawing the bar element within the soft dock envelope towards the vehicle;
a means for retaining the bar element in a hard dock configuration; and
a means for establishing two or more axis alignment and shear force resistance for a connection between the vehicle and the mating vehicle in the hard dock configuration.

19. The vehicle of claim 18, wherein the bar element comprises a preload means that couples ends of the bar element to mounting members on the mating vehicle, and wherein the preload means applies a preload force to the bar element movably disposed in slots of the mounting members.

20. The vehicle of claim 18, comprising:
means for quick release of at least the bar element from the mating vehicle to abort the mating vehicle from the soft capture envelope or the hard capture configuration.

* * * * *